March 19, 1929.
C. B. LEAR
1,705,576
AUTOMOBILE HEATER
Filed Jan. 13, 1927
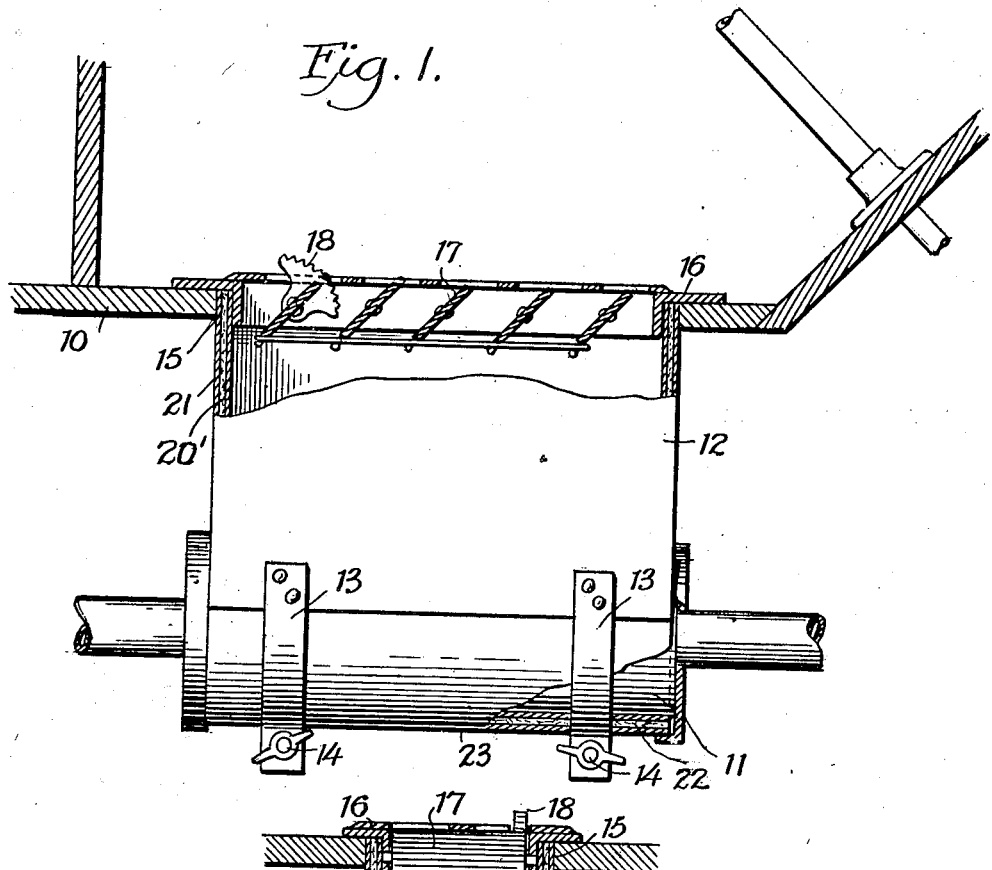
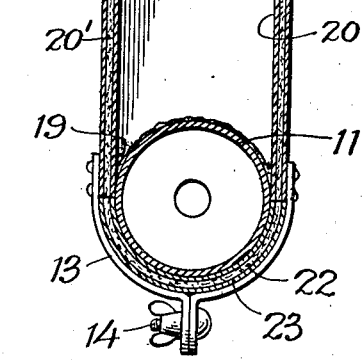
INVENTOR.
Charles B. Lear
BY
ATTORNEY.

Patented Mar. 19, 1929.

1,705,576

UNITED STATES PATENT OFFICE.

CHARLES B. LEAR, OF GREENCASTLE, PENNSYLVANIA.

AUTOMOBILE HEATER.

Application filed January 13, 1927. Serial No. 160,970.

My said invention relates to an automobile heater, and it is an object of the same to provide a device of this character which shall be simple in construction, easily applied to automobiles now in use, and cheap to manufacture.

Another object is to provide a device of this character in which there is no danger of entrance of exhaust gas to the interior of the car as in some devices now in use, for the reason that the normal exhaust lines are not interferred with in the application of my device whether the same is applied at the time the car is assembled or subsequently.

A further object is to avoid any air-ports in the device by which drafts may be created or dust be admitted to the interior of the car.

Referring to the drawings, which are made a part of my application and in which similar reference characters indicate similar parts:

Fig. 1 is an elevation of my device as applied to an automobile, and

Fig. 2, a cross-section of the same.

In the drawings, reference character 10 indicates the floor of a car having a muffler 11 of any conventional or desirable character connected to the engine in the ordinary manner. A hollow casing or shaft 12 rests on the muffler, this device being so formed at the lower end as to engage closely with the muffler. For this purpose the sides of the shaft may be so spaced as to fit closely against the sides of the muffler and the ends have semicircular cuts as illustrated. Downward extensions 13 have openings at their lower ends through which pass bolts or rivets 14, by means of which the shaft is clamped to the muffler, it being understood that other means are contemplated for holding the parts in place. For example, the shaft might be made in one piece with the shell of the muffler or with the upper part of the shell if the same is in more than one piece, in case the heater is built into the car at the factory.

The shaft preferably extends upward through an opening in the floor of the automobile as at 15. It is intended that the shaft shall fit in the opening and a register 16 has a depending flange fitting in the shaft and another resting on the floor of the car whereby the joint between the floor and the shaft is effectively closed so as to substantially prevent any ingress of air and, in effect at least, render the joint air-tight. The register is provided with a suitable valve or closure of any preferred or conventional type as indicated at 17 said valve having operating means as a handle 18 for regulating the heat entering the car.

The joint between the shaft and the muffler is preferably sealed as at 19 by means of a plastic composition of asbestos and a binder which hardens after application, to preclude the entrance of air at the lower end of the shaft, the radiation of heat from the muffler being relied on as ample for heating. Preferably the walls of the shaft are double as indicated at 20, 21 and a layer 20' of asbestos is placed between them.

As a further means of increasing the heating action I may provide insulation fitting about the under side of the muffler as shown at 22. The insulating material may be protected against mud and water by means of a metallic or other suitable plate 23. Both the insulation and the plate are preferably held in place by the extensions 13, which may be suitably varied in number and size to serve effectively for holding all the parts together.

Ordinarily the device as shown will be suitable for attachment to automobiles of any make. In certain cars such as the Chevrolet an opening will have to be cut in the shaft or casing to admit a brace supporting the muffler, and in such cases the joint between the muffler and the shaft may be sealed in the manner above described. Commonly cement should also be applied to the joints at the ends of the heater resting on the muffler.

Numerous other changes besides those above suggested will be obvious to those skilled in the art and many such will fall within the spirit of my invention; therefore I do not limit myself to the specific form of the invention shown in the drawings and described in the specification, but only as indicated in the appended claims.

Having thus fully described my said invention, what I claim and desire to secure by Letters Patent is:

1. The combination, in a heater for motor vehicles having an exhaust pipe extending from the motor and a muffler for the exhaust, of a hollow shaft of elongated rectangular cross section, open at both ends and having the edge of each of two opposite walls, at one end, recessed to adapt the said end for snug engagement over the muffler, the other end of the shaft being shaped to project through an opening in the floor of the vehicle, means for maintaining the shaft in position on the muffler, and a plastic sealing element overlying said muffler casing within the shaft for effectively closing the joint between the shaft and casing against ingress of cold air.

2. The combination in a heater for motor vehicles having an exhaust pipe extending from the motor and a muffler for the exhaust, of a hollow shaft formed to rest upon the muffler at one end to engage the same snugly and having the other end formed to extend through an opening in the vehicle floor, a substantially semi-cylindrical heat insulated body covering the lower surface of the muffler and abutting, at its longitudinal edges, adjacent edges of the shaft, depending arms carried by the shaft at opposite sides and having their free ends curved inwardly beneath said body, and means for connecting the ends of the arms on one side of the shaft to those upon the opposite side, to maintain the shaft in position.

3. A heater for motor vehicles having an exhaust pipe extending from the motor and a muffler for the exhaust, said heater comprising a hollow shaft or casing having one end formed to rest upon the muffler and to engage the same snugly and the other end formed to extend through an opening in the vehicle floor, clamping arms carried by and extending downwardly from opposite sides of the casing, a member covering the lower part of the muffler below the casing and means for coupling oppositely positioned arms together beneath said muffler to maintain the casing and said member in position.

In testimony whereof I affix my signature.

CHARLES B. LEAR.